Figure 1:
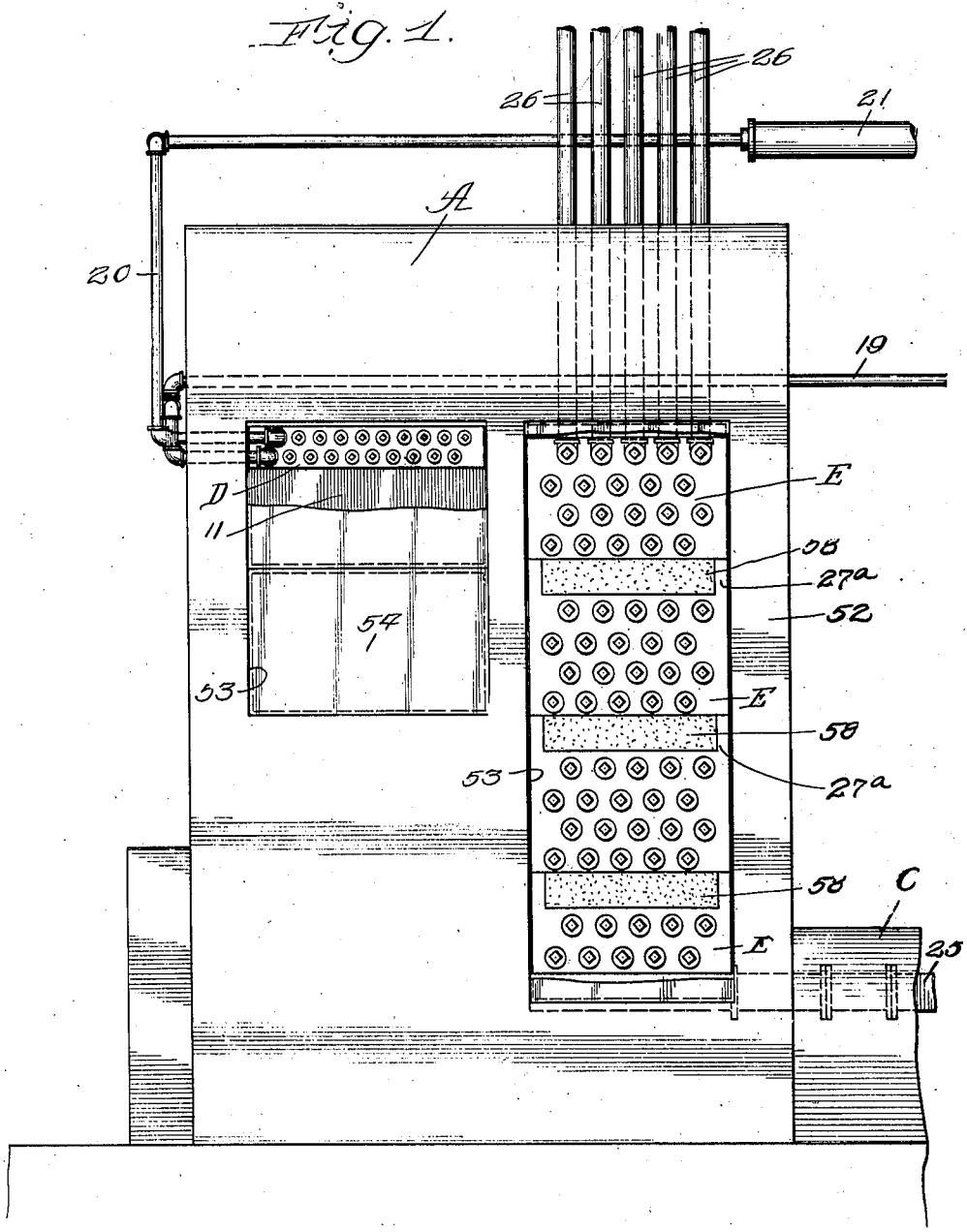

Jan. 13, 1931.  G. W. WATTS  1,789,267

PIPE STILL

Original Filed July 18, 1925  9 Sheets-Sheet 1

Inventor:
George W. Watts,
By Dynaforth, Lee, Clinton & Miles
Attys.

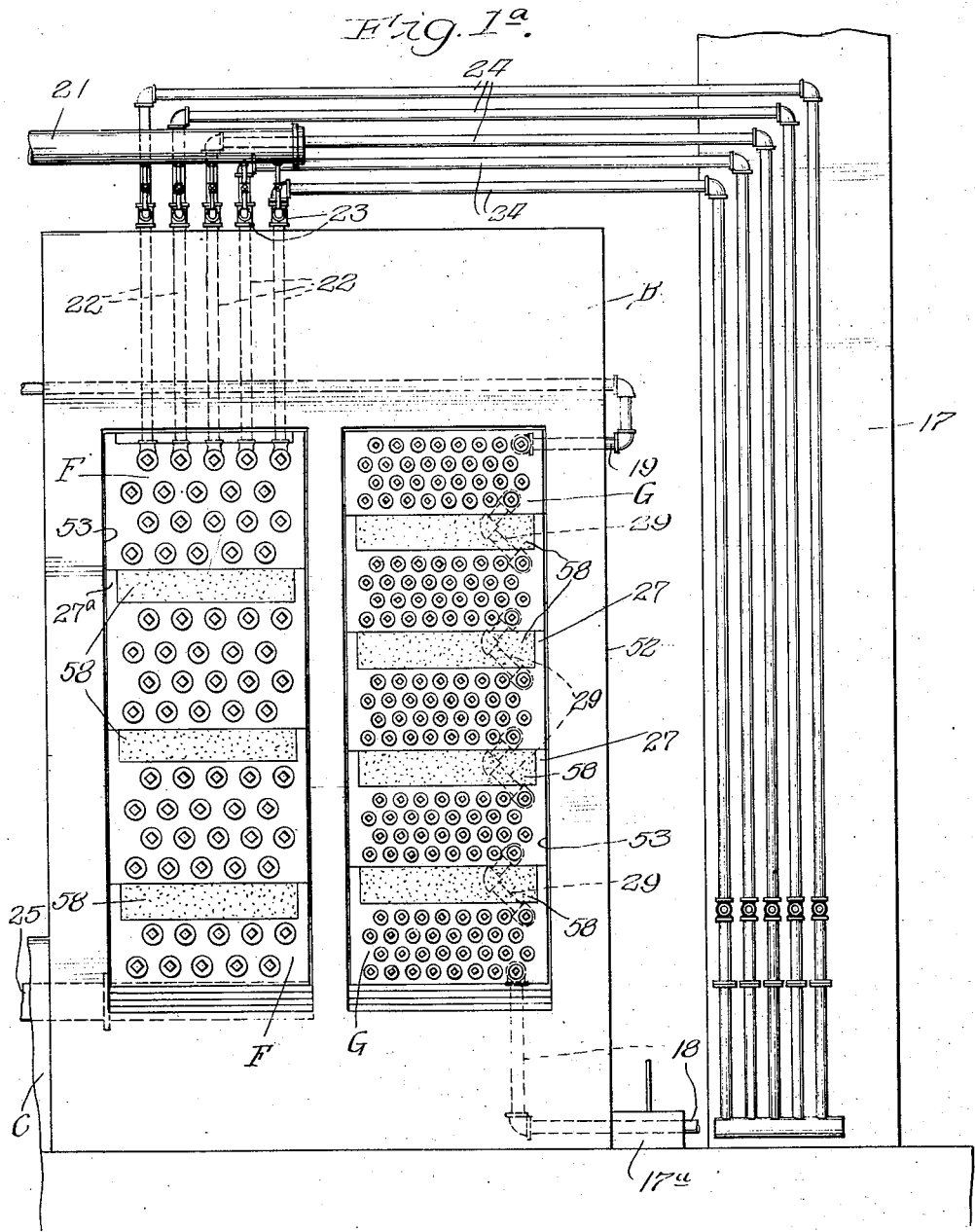

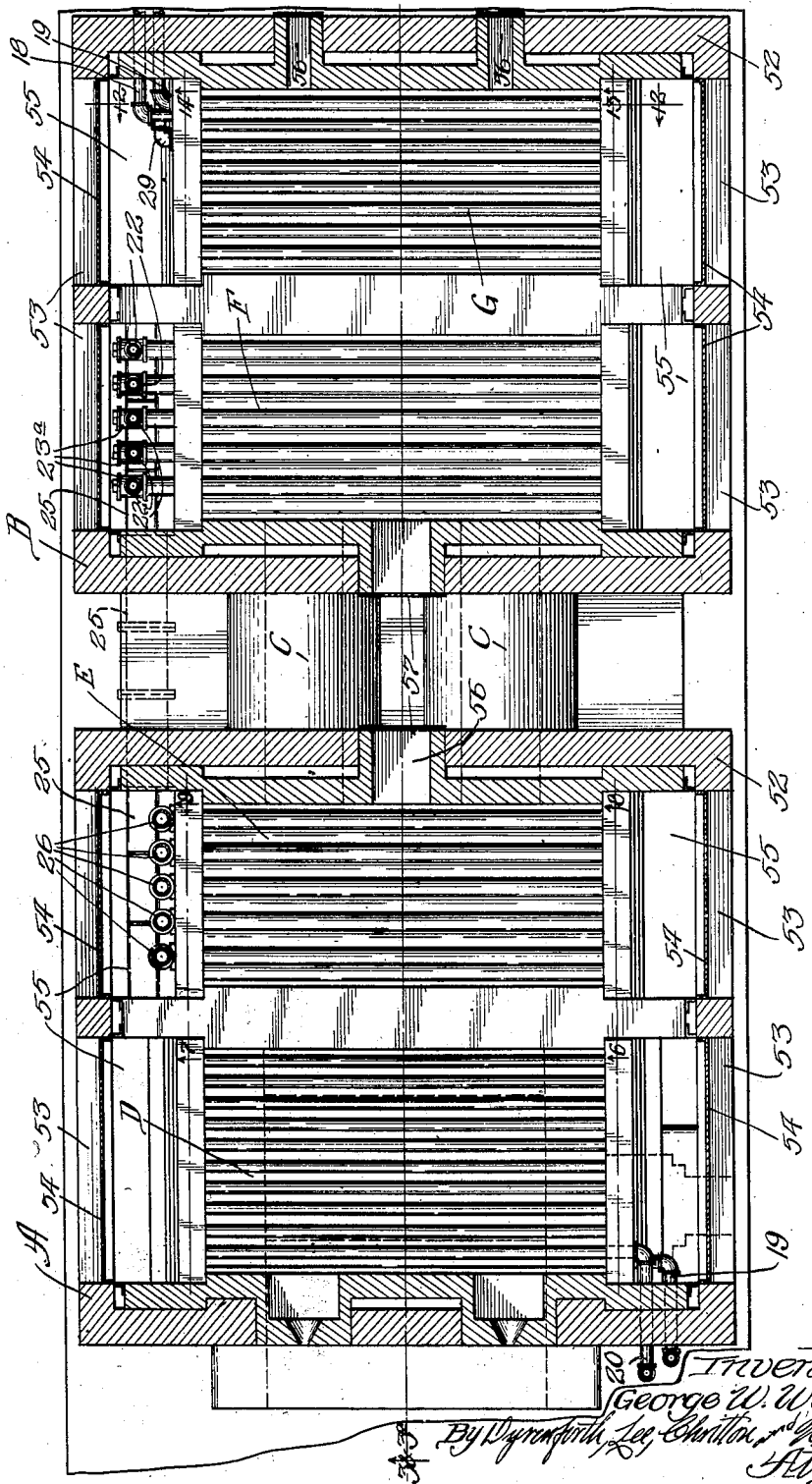

Jan. 13, 1931. G. W. WATTS 1,789,267
PIPE STILL
Original Filed July 18, 1925 9 Sheets-Sheet 4
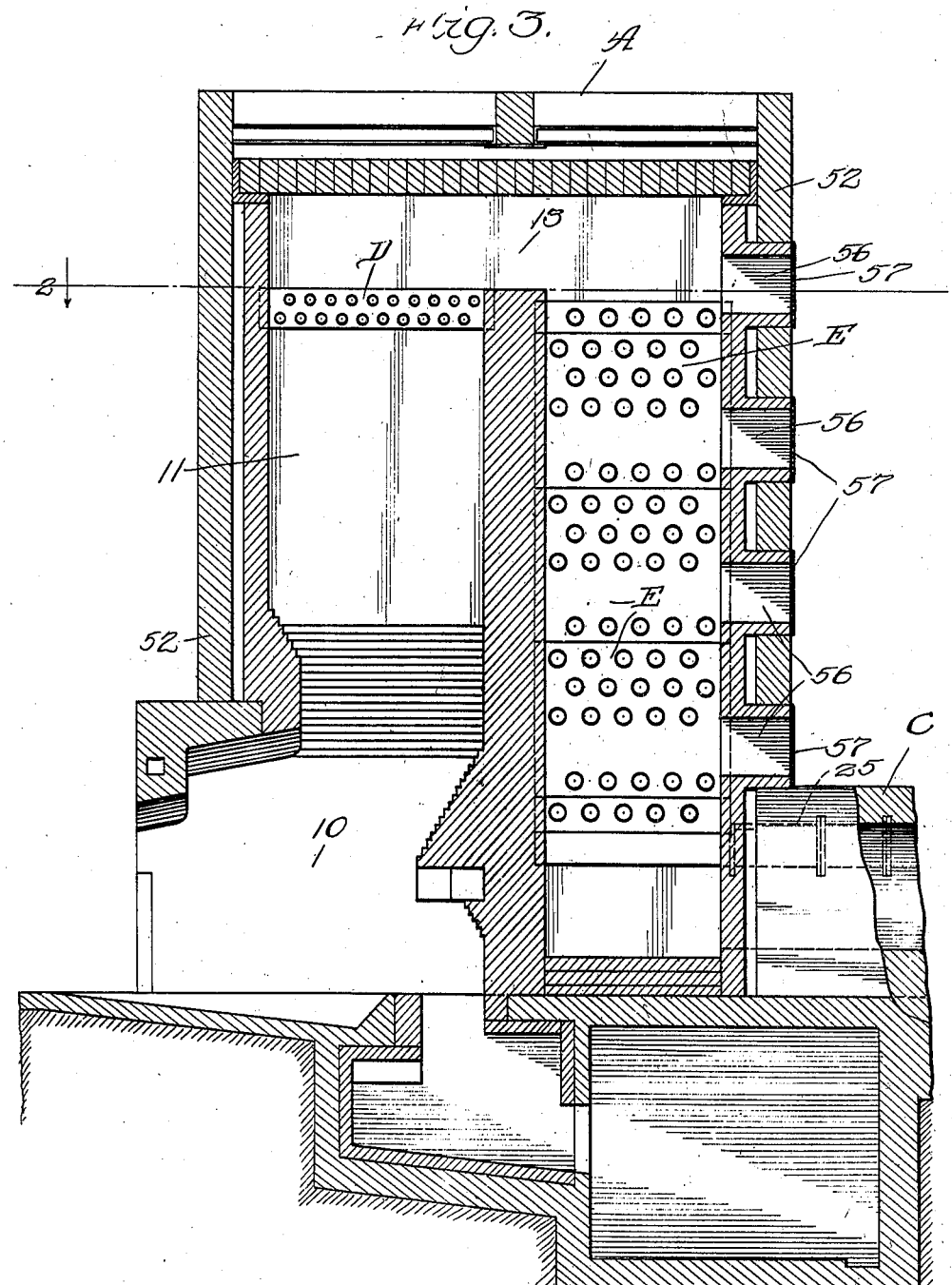

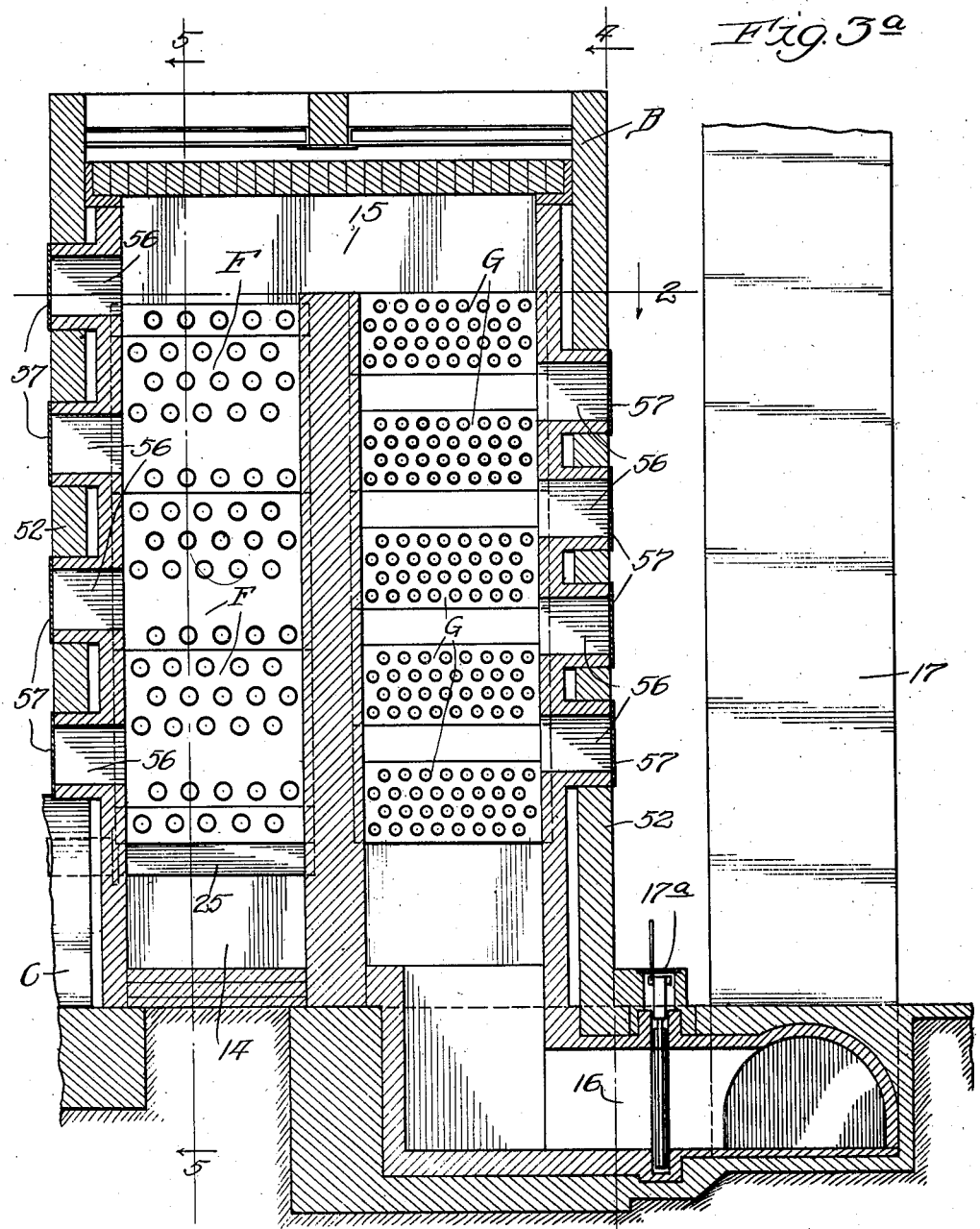

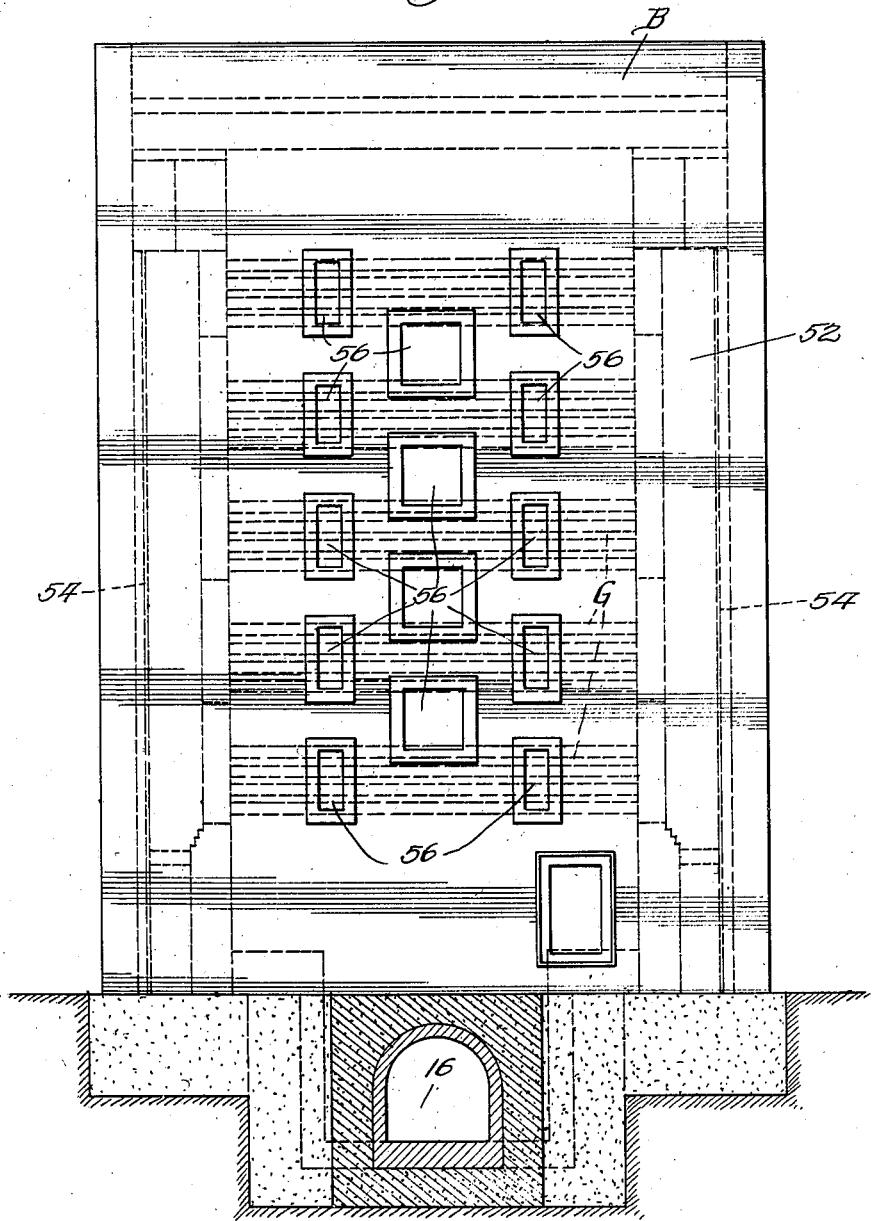

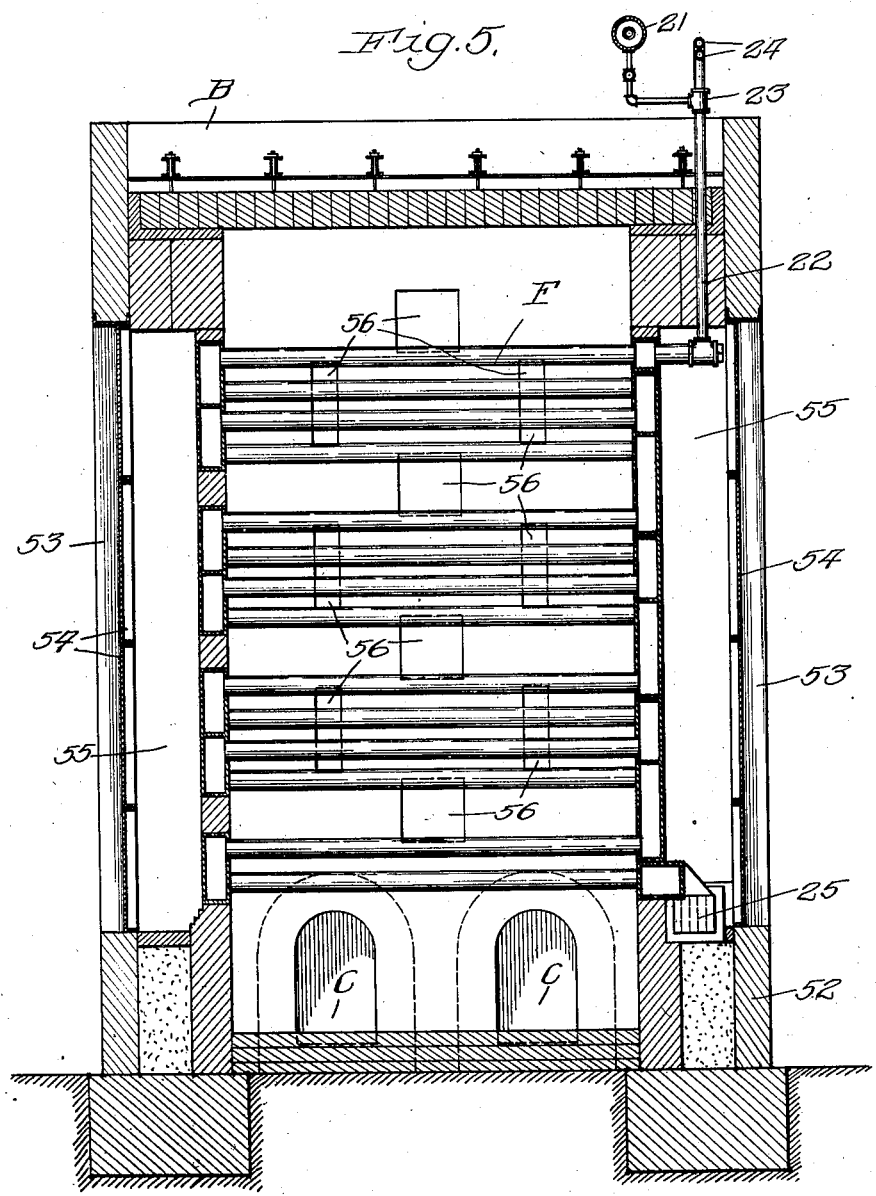

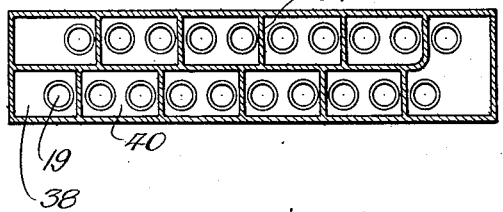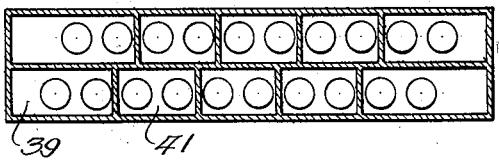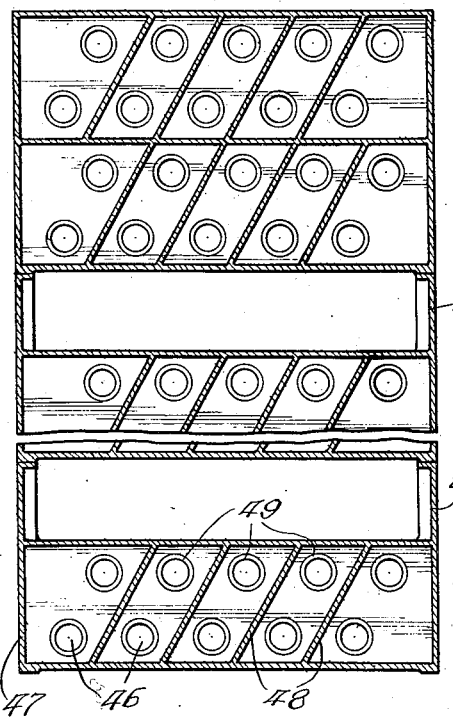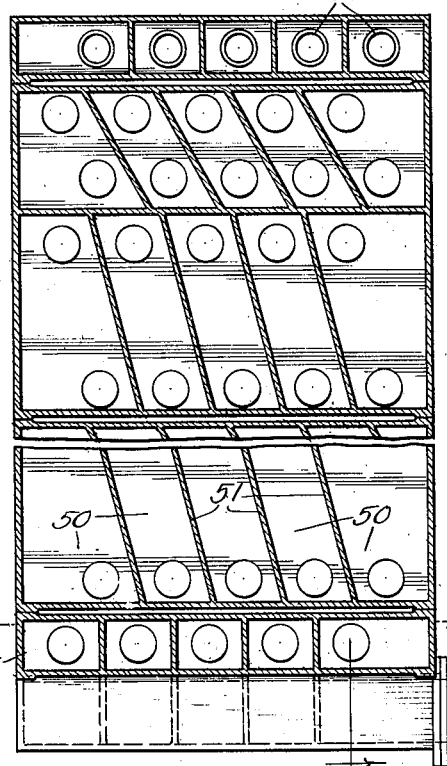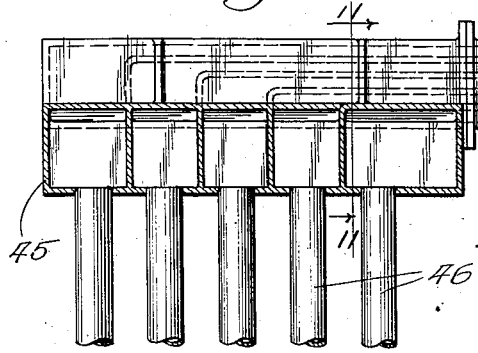

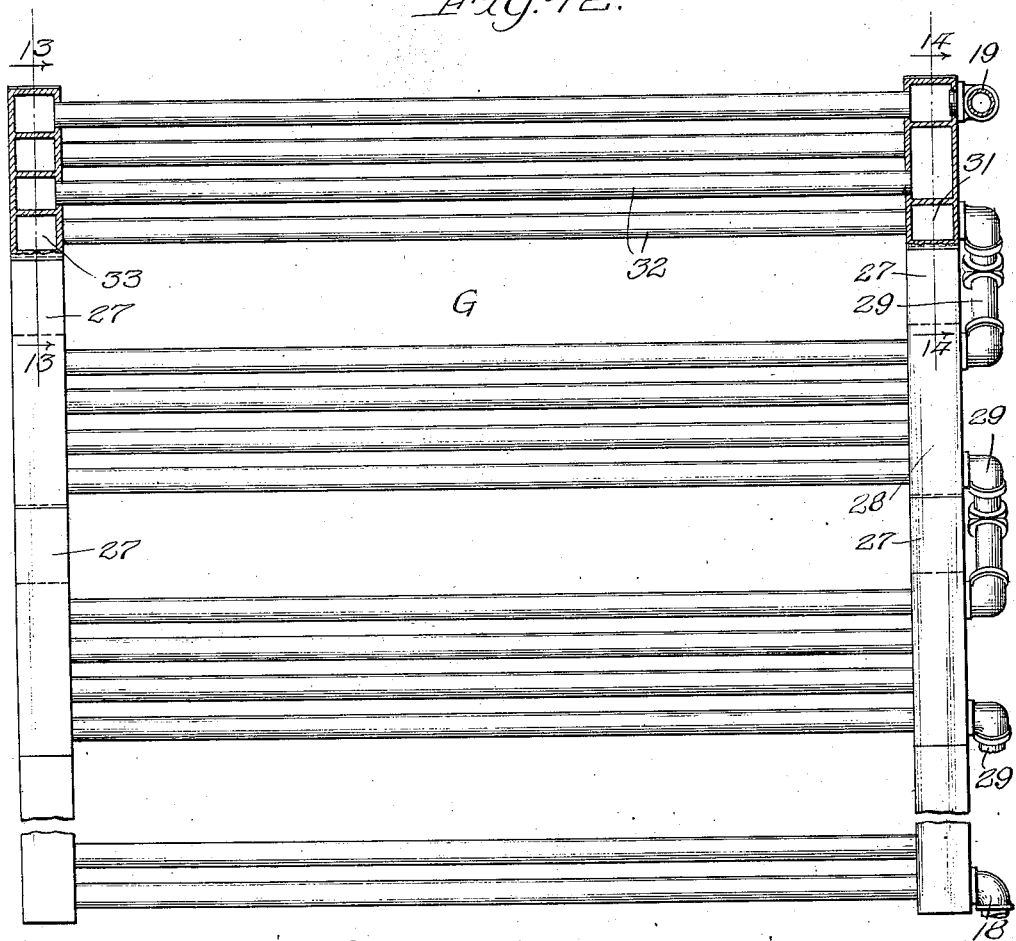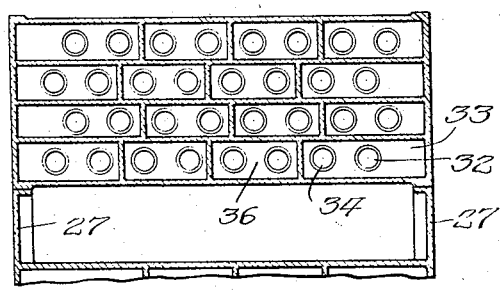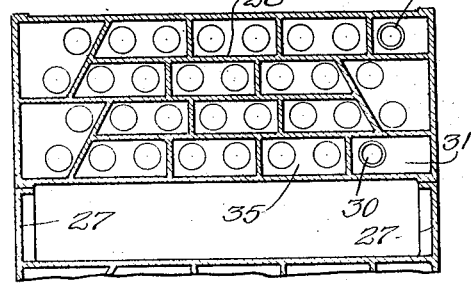

Patented Jan. 13, 1931

1,789,267

UNITED STATES PATENT OFFICE

GEORGE W. WATTS, OF WHITING, INDIANA, ASSIGNOR TO STANDARD OIL CO., OF WHITING, INDIANA, A CORPORATION OF INDIANA

PIPE STILL

Application filed July 18, 1925, Serial No. 44,555. Renewed October 3, 1927.

This invention relates to improvements in pipe stills and is here shown as embodied in a pipe still especially adapted for the treating of oil.

Among the features of my invention is the provision of headers supporting the ends of the pipes. Certain of these headers are separated by supporting feet which in turn are shielded by the brick-work so as not to be exposed to flue gases and heat.

Another feature of my invention is the provision of plugged holes opposite the tube holes in the headers so that the tubes can be cleaned and rolled. New tubes also can be inserted through the plugged holes. Old tubes can be removed through the plugged holes or dropped and removed through the nearest space between headers. The spaces between adjacent tubes is somewhat greater than the outside diameter of a tube in order to permit the tube to be dropped between.

By the use of headers I am able to eliminate the use of steel or cast iron supporting tube sheets which must be protected from the hot flue gases by insulating or so-called backing tile. Such tile are expensive, rather difficult to place, and practically impossible to replace without completely wrecking the heating coils.

My headers also replace the return bends generally used in stills of this kind and in any event eliminate a large number of joints. They give additional heating surface, are accessible and easy to replace. The removal of any header disturbs only the tubes connected to it; the headers and tubes on either side being undisturbed.

It may be mentioned also, among the features of my invention, that the general design of the pipe still itself is novel and an improvement over pipe stills heretofore in use in that it is accessible for inspection, tube blowing (outside), tube cleaning (inside) and tube removal.

In my improved still it is possible to inspect practically the entire surface of every tube. This same provision makes it easy to blow the exterior tube surface. A relatively short tube blower may be used. The headers make it easy to inspect and clean the inner tube surface.

In my improved still, a counterflow is obtained except for a two layer pipe screen in the pass directly above the stoker. The oil which is circulated through this pipe screen is comparatively cold and can absorb a large amount of radiant heat. The screen thus serves to protect the top arch from destructive overheating.

Other features and advantages of my invention will appear more fully as I proceed with my specification.

It will assist in the explanation and understanding of the device to assume that the still as shown in the drawings stands in a certain position with respect to the points of the compass. In connection with certain of the views I will also speak of the "near" and the "far" side of the device for convenience. It is to be understood, however, that the use of such terms and the points of the compass are merely for the purpose of assisting in giving a clear understanding of the device.

In that form of device embodying the features of my invention, shown in the accompanying drawings, Figures 1 and 1ª together are a view in side elevation of the east side of the still, the observer looking west, Fig. 2 is a horizontal sectional view, taken as indicated by the line 2 of Figs. 3 and 3ª, Figs. 3 and 3ª are views taken as indicated by the line 3 and 3ª of Fig. 2, the observer looking west, Fig. 4 is a view taken as indicated by the line 4 of Fig. 3ª, the observer looking south, Fig. 5 is a view taken as indicated by the line 5 of Fig. 3ª, the observer looking south, Fig. 6 is a vertical sectional view of a header taken as indicated by the line 6 of Fig. 2, Fig. 7 is a similar view taken as indicated by the line 7 of Fig. 2, Fig. 8 is a vertical sectional view of the headers on one side of a bank, with a part broken away taken as indicated by the line 8 of Fig. 2, Fig. 9 is a similar view taken as indicated by the line 9 of Fig. 2, Fig. 10 is a horizontal sectional view of a header and manifold taken as indicated by the line 10 of Fig. 9, Fig. 11 is a view taken as indicated by the line 11 of Fig. 10, Fig. 12 is a view taken as indicated by the line 12 of Fig. 2, the observer looking south, Fig. 13 is a vertical sectional view of a header taken as indicated by the line 13 of Fig. 12 or the line 13 of Fig. 2, and Fig. 14 is a similar view taken as indicated by the line 14 of Fig. 12, or the line 14 of Fig. 2.

As shown in the drawings, the pipe still comprises two substantially rectangular structures A and B connected at their bottoms by the two arched passage-ways C, C.

Reference to Figs. 3 and 3ª will give a general idea of the passage of flue gases through the still. 10, 11 indicate in general the combustion chamber in which is arranged the stoker, etc, not shown, since the details of these form no part of the present invention. The products of combustion and hot gases pass upwardly from the combustion chamber 10, 11 through the pipe screen which is also exposed to direct radiation and which is indicated in general by D, thence horizontally through the passage 13, and thence downwardly through the first bank of tubes indicated in general by E. Upon emerging at the lower end of the bank E, the products of combustion and hot gases pass through the arched passage-ways C into the chamber 14 in the structure B. From the chamber 14 they pass upwardly through the bank of tubes F, thence through the passage-way 15, then downwardly through the bank of tubes G. Upon leaving the lower end of the bank of tubes G, the gases escape through the passage-way 16 into the stack 17.

The flow of oil, in general, is counter to the direction of travel of the flue gases, with the exception of the pipe screen D. I will now describe in general the flow of the oil as I believe that such a general description first will aid in understanding the detailed description to follow:

The oil is pumped in by means of a pump 17ª through the inlet pipe 18, entering at the bottom of the bank G. The tubes in this bank form a single tube continuous coil. The headers on each side are connected by means of a single pipe. The same type of headers is used on both sides. The oil leaves the bank G at the top through the pipe 19 through which it passes to the pipe screen D. The pipe screen is also a single tube continuous coil. The oil leaves the pipe screen through the pipe 20 which enters the drum 21. The oil leaves the drum 21 downwardly through the five pipes 22, 22. Entering each of these pipes 22 at the T 23 is a steam pipe 24 so that steam is mixed with the oil as it leaves the drum 21.

The mixture of oil with the steam passes downwardly through the bank of tubes F in which five tubes are in parallel. The oil and steam mixture leaves the bottom of bank F through the pipe 25 which contains five separate passages 25ª, 25ª arranged in parallel, one corresponding to each of the five bottom pipes in the bank. From the pipe 25, the oil enters the bottom of bank E, flows upwardly therethrough and leaves at the top by means of the pipes 26, 26.

I will now describe the construction and operation of the still more in detail. The headers used in bank G are shown in vertical cross-section in Figs. 13 and 14. There are five of these headers at each side of the still, and their construction is substantially the same except that the top header on each side does not have the separating legs, lugs or supports 27. The oil enters the bottom header of bank G on the west side at the north end of the bottom row of tubes and leaves at the north end of the top row. It enters the second header from the bottom in the same manner and leaves in the same manner. It leaves the bank at the top of the top header through the pipe 19. Fig. 14 is a vertical cross-section of the top header of this bank on the west side and Fig. 13 is a similar view of the top header on the east side. Each of the four headers below the top header is the same as the top on that side except that the separating legs 27, 27 are provided. The headers are preferably made of cast steel with partitions 28, cast therein as shown. Adjacent headers are connected by means of the pipe connections 29. The inner faces of the headers are provided with openings for the ends of the pipes and there is an opening opposite each pipe opening closed by a plug. In Fig. 14, showing the top header of bank G on the west side of the still 30 indicates the pipe entering this header from the header below. It will be seen that the oil enters the chamber 31 in this header. From this chamber the oil passes through the pipe 32 to the chamber 33 in the top header on the east side shown in cross-section in Fig. 13. (See also Fig. 12.) The oil leaves chamber 33 through the pipe 34 entering the chamber 35 in the top header on the west side. From this chamber it passes back through the return pipe entering the chamber 36 in the top header on the east side.

In this manner it circulates back and forth between the two headers through a continuous pipe coil finally leaving the top header on the west side by the pipe 19.

I have described in detail the circulation between the top headers of bank G. It is to be understood that the circulation between the other headers is the same and, consequently, need not be described in detail. The circulation it is to be noted enters through pipe 18 into the bottom headers and circulates upwardly leaving the top headers by the pipe 19. The circulation after passing through one pair of headers proceeds upwardly to the next pair of headers through one of the pipes 29.

After leaving the top headers of bank G the oil passes through the pipe 19 and enters the east header of the pipe screen D. This east header is shown in section in Fig. 6. The west ends of the pipes of this pipe screen are connected to the west header of the pipe screen which is shown in section in Fig. 7. Each of these headers is provided with baffle plates or partitions 37 as shown so that the circulation of oil through the pipe screen will be a one pipe circulation. That is, the oil enters the east header (see Fig. 6) going into the chamber 38. From this chamber it passes by the first pipe into the chamber 39 in the west header. It returns by the second pipe entering the chamber 40 in the east header, goes back by the third pipe entering the chamber 41 in the west header, and so forth. The oil leaves the pipe screen by the pipe 20 and enters the drum 21. From the drum 21 the oil flows downwardly into the five pipes 22, 22, entering the top of F bank on the west side. As the oil leaves the drum 21 it is mixed with steam entering through the five pipes 24, 24, which enters the pipes 22, 22 at the T's 23, 23.

The mixture of oil and steam enters the top header on the west side of bank F. Through the banks F and E the circulation of the oil and steam mixture is through five pipes in parallel. The headers in banks F and E are similar and the circulation through these banks is similar and, consequently, I will describe in detail but one of these banks. It is to be noted, however, that the circulation of the mixture of oil and steam through the F bank is downwardly and through the E bank is upwardly. The mixture leaves the F bank at the bottom on the west side through the square pipe 25 having five compartments 25ª, 25ª, one corresponding to each of the five bottom pipes of the bank. From the pipe 25 with its five separate passageways, the mixture enters the bottom header on the west side of the E bank. This header is shown in Fig. 9 at the bottom being indicated by 45 and also in Fig. 10. The five pipes leading from this header, being the bottom five pipes of the bank are shown in Fig. 10 as indicated by 46, 46. From the pipes 46, 46 the mixture enters the bottom header 47 on the east side (see Fig. 8). The header 47 is provided with the baffle plates or partitions 48, 48, so that the circulation of the mixture through the five pipes is maintained in these five pipes in parallel. The mixture leaves the header 47 through the pipes 49, 49 and enters the compartments 50, 50 in the next to the bottom header on the west side. This header is likewise provided with baffle plates or partitions 51, 51. In this manner, the mixture passes back and forth through five pipes in parallel between the headers of bank E, leaving the top header on the west side by the pipes 26, 26. It is to be noted that on the west side, the headers of bank G are connected by the single pipes 29. The same plan could be followed with regard to the headers on the west side of banks E and F but it is to be noted that in these banks since the circulation is through five pipes in parallel, the headers would have to be connected by five pipes which would completely block any opening space between the headers. Accordingly the space between the headers on the west side of banks E and F is omitted, and the headers are extended to take the place of the connecting pipes. These headers of bank E are shown in Fig. 9. The headers of this bank on the east side are shown in Fig. 8 and it will be noted with respect to these headers there is a space between adjacent headers.

The structures A and B are generally built out of brick work, concrete, masonry or the like with suitable iron, steel or other reinforcing means. The brick work, masonry or the like is generally indicated by 52. The side walls of the structures A and B are provided with large openings 53 opposite the headers of the banks, these openings being closed by suitable panels or plates 54 made out of any suitable material such as iron. The side walls are spaced a short distance from the headers, so that a space 55 is provided between the headers and the plates 54. These plates 54 may be removed so that the headers are accessible through the openings 53 in the side walls. Openings 56, 56 are provided in the end walls of the structures which are closed by suitable removable doors or plates 57, 57.

The headers on the east side of banks E and F, excepting the top ones, are also provided with separating legs or supports 27ª, 27ª (see Fig. 8) similar to the separating legs 27, 27 on the headers in bank G (see Figs. 13 and 14). All the separating legs or supports 27, 27, and 27ª, 27ª, are shielded by the brick work and protected from deteriorating effects of the flue gas. Reference to Figs. 3 and 3ª will show that the brick work overlaps the ends of the headers so that these supporting feet or separating legs are located in recesses in the masonry in order to protect them from the flue gases. Reference to Figs. 1 and 1ª will show that the spaces between the headers formed by these separating legs or supports are filled with brick, concrete, or other insulating material, as indicated by 58.

It will be noted that after the oil is once divided into five parallel streams, the separate streams are not again remixed. It will be seen that all the headers in banks E and F are provided with the partitions or walls such as 48 and 51 in order to keep the five streams separate. Likewise, the pipe 25 contains five separate passages 25ª, 25ª, to keep the streams separate. It will be noted also that the division into five streams takes place before the steam is introduced, or, if steam is not used, before the vaporization commences. By means of this construction the vapor in each of the five parallel streams will remain in the stream in which it formed or was introduced. If the streams were not kept separate through the banks E and F there would be danger of the vapor from the five streams combining in one place, for example, in one of the headers, and then passing into one of the banks (for example bank E), say, in two streams with the oil alone in the other three streams. The vapor streams would not take heat as readily as oil streams and would not have the same heat capacity. Hence there would be danger of the vapor tube overheating and burning. The vapor streams might even be heated to a cracking temperature, causing coke troubles and also affecting the quality of the distillate.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

It has been stated that one of the features of the invention is the ability to remove the tubes by dropping them and then taking them out through the nearest space between headers. Reference to Figs. 1 and 1ª will show that the headers (excepting the top ones) are provided with upwardly projecting spacing legs or supports 27 and 27ª. This serves to space the headers apart, such spaces being filled by suitable brick, concrete, or other insulating material 58. This concrete or brick is easily removable without disturbing the headers. When this material 58 is removed there is sufficient space between the two headers to permit the removal of the tube therethrough. Any tube can be loosened and then dropped down to the first space and thus taken out.

What I claim as new, and desire to secure by Letters Patent, is:

1. In a pipe still; a housing having therein a combustion chamber and an elongated passage for the products of combustion; a plurality of banks of oil tubes in said passage; a pipe screen in said combustion chamber; pipe connections between said banks of oil tubes and said pipe screen; and means for causing flow of oil through one of said banks of oil tubes in a direction adverse to the direction of flow of said products of combustion, thence through said pipe screen, and thence through the remaining banks of oil tubes in a direction adverse to the direction of flow of said products of combustion.

2. In a pipe still; a housing having therein a combustion chamber and an elongated passage for the products of combustion; a bank of oil tubes in said passage, said bank having a single tube continuous coil; a second bank of oil tubes in said passage, said bank having a continuous coil of a plurality of oil tubes in parallel; pipe connections between said banks of oil tubes; and means for causing flow of oil first through said first bank and then through said second bank.

3. In a pipe still; a housing having therein a combustion chamber and an elongated passage for the products of combustion; a bank of oil tubes in said passage, said bank having a single tube continuous coil; a second bank of oil tubes in said passage, said bank having a continuous coil of a plurality of oil tubes in parallel; means for introducing steam into oil tubes at a point between said first and said second banks; and means for causing oil to flow through said first bank, and a mixture of oil and steam to flow through said second bank.

4. In a pipe still; a housing having therein a combustion chamber and an elongated passage for the products of combustion; a plurality of banks of oil tubes in said passage; one or more rows of oil tubes in said combustion chamber exposed to direct radiation; pipe connections between said banks of oil tubes and said oil tubes exposed to direct radiation; and means for causing flow of oil through one of said banks of oil tubes; thence through said oil tubes exposed to direct radiation and thence through the remaining banks of oil tubes.

5. In a pipe still; a housing having therein a combustion chamber and an elongated passage for the products of combustion; a plurality of banks of oil tubes in said passage; one or more rows of oil tubes in said combustion chamber exposed to direct radiation; pipe connections between said banks of oil tubes and said oil tubes exposed to direct radiation; and means for causing flow of oil through one of said banks of oil tubes, thence through said oil tubes exposed to direct radiation and thence through the remaining banks of oil tubes in a direction adverse to the direction of flow of said products of combustion.

6. In a pipe still; a housing having therein a combustion chamber and an elongated passage for the products of combustion; a plurality of banks of oil tubes in said passage; a pipe screen in said combustion chamber; pipe connections between said banks of oil tubes and said pipe screen; and means for causing flow of oil through one of said banks of oil tubes, thence through said pipe screen, and thence through the remaining banks of oil tubes.

7. In a pipe still; a housing having therein a combustion chamber and an elongated passage for the products of combustion, a portion of said passage adapted to conduct said products of combustion downwardly; a bank of oil tubes in said passage, said bank having a single tube continuous coil; a second bank of oil tubes in said passage, said bank having a continuous coil of a plurality of oil tubes in parallel, said second bank being located in said portion of said passage where the gases flow downwardly; pipe connections between said banks of oil tubes; and means for causing flow of oil first through said first bank and then through said second bank.

8. In a pipe still; a housing having therein a combustion chamber and an elongated passage for the products of combustion; a plurality of banks of oil tubes in said passage; one or more rows of oil tubes in said combustion chamber exposed to direct radiation, said oil tubes being spaced from the walls of said combustion chamber; pipe connections between said banks of oil tubes and said oil tubes exposed to direct radiation; and means for causing flow of oil through one of said banks of oil tubes; thence through said oil tubes exposed to direct radiation and thence through the remaining banks of oil tubes.

9. In a pipe still; a housing having therein a combustion chamber and an elongated passage for the products of combustion; a plurality of banks of oil tubes in said passage; one or more rows of oil tubes in said combustion chamber exposed to direct radiation, said oil tubes being spaced from the walls of said combustion chamber; pipe connections between said banks of oil tubes and said oil tubes exposed to direct radiation; and means for causing flow of oil through one of said banks of oil tubes, thence through said oil tubes exposed to direct radiation and thence through the remaining banks of oil tubes in a direction adverse to the direction of flow of said products of combustion.

10. In a pipe still; a housing having therein a combustion chamber and an elongated passage for the products of combustion; a plurality of banks of oil tubes in said passage; a pipe screen in said combustion chamber and spaced from the walls thereof; pipe connections between said banks of oil tubes and said pipe screen; and means for causing flow of oil through one of said banks of oil tubes, thence through said pipe screen, and thence through the remaining banks of oil tubes.

In testimony whereof I have hereunto set my hand this 9th day of July, 1925.

GEORGE W. WATTS.